Patented July 12, 1932

1,867,057

UNITED STATES PATENT OFFICE

HANS BUCHLOH, OF LEVERKUSEN-ON-THE-RHINE, WALTER MIEG, OF OPLADEN, NEAR COLOGNE-ON-THE-RHINE, AND WALTHER STOETZER, OF LEVERKUSEN-ON-THE-RHINE, GERMANY, ASSIGNORS TO GENERAL ANILINE WORKS, INC., OF NEW YORK, N. Y., A CORPORATION OF DELAWARE

PROCESS OF PREPARING MONOBENZOYLDIAMINO-ANTHRAQUINONE

No Drawing. Application filed November 21, 1928, Serial No. 321,034, and in Germany August 30, 1926.

The present invention relates to a process of preparing monobenzoyl diamino-anthraquinones, more particularly it relates to a process of preparing compounds of the probable formula

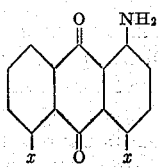

wherein one $x$ stands for hydrogen and the other $x$ stands for the group $NH.CO.C_6H_5$.

In accordance with the invention 1-benzoylamino-4-aminoanthraquinone and 1-benzoylamino-5-aminoanthraquinone are obtainable in a convenient manner and in good yield, by heating the corresponding diamino-anthraquinones in the presence of an acid binding agent and of a suitable high boiling inert organic solvent, such as nitrobenzene, ortho-dichlorobenzene, trichlorobenzene and the like, with benzoylchloride in a quantity corresponding to about 120–140% of the theoretical amount. As acid binding media suitable for performing our process, alkali metal carbonates, magnesium oxide, calcium oxide, pyridine and its homologues, quinoline and the like may be mentioned by way of example; whereby in the case of 1.5-diamino-anthraquinone an alkali metal carbonate, especially sodium carbonate, in the case of 1.4-diamino-anthraquinone sodium carbonate, pyridine or a homologue thereof will yield the best results.

The temperatures to be used may vary in wide limits, mainly depending on the kind of diamino-anthraquinone and on the acid binding agent used. For instance, when working with 1.5-diaminoanthraquinone in the presence of sodium carbonate, temperatures of about 140–180° C. will be suitable ones, whereas when replacing the 1.5-diaminoanthraquinone by 1.4-diaminoanthraquinone, temperatures between about 10–50° C. will yield better results.

The reaction is advantageously performed by dissolving or distributing the diaminoanthraquinone in the organic solvent, adding the acid binding medium in an amount at least sufficient to bind all of the hydrochloric acid being liberated during the reaction, and then causing the benzoyl chloride to run in slowly while stirring and while heating the mixture to the temperatures above mentioned.

The manner of working up the reaction product differs according to the diaminoanthraquinone used as starting material. When starting, for instance, with 1-4-diaminoanthraquinone, the reaction proceeds so smoothly, that without further treatment a technically useful product results. In the case of 1-5-diaminoanthraquinone a fractional separation of the reaction product is necessary. In this case an addition of an aliphatic alcohol, especially ethylalcohol, has been found essential for carrying out the separation process. By this addition the small amounts of 1.5-dibenzoyldiaminoanthraquinone, having been formed simultaneously with the monobenzoyl compound, can be caused to separate, and from the filtrate the 1-benzoylamino-5-aminoanthraquinone can easily be isolated in a state of purity, sufficient for using the compound as intermediate product in the manufacture of dyestuffs without any further cleaning.

The following examples illustrate our invention, without limiting it thereto, the parts being by weight:—

*Example 1.*—To a mixture of 100 parts of 1.4-diamino-anthraquinone and 500 parts of nitrobenzene, 135 parts of collidine are added and the mixture is heated to about 145–150° C., until all water has escaped. After quickly cooling to 15–20° C., 80 parts of benzoylchloride, dissolved in 100 parts of nitrobenzene are gradually added, care being taken that the temperature not surmounts 25° C. After the addition of the benzoylchloride the temperature is maintained at about 30° C., until no more unchanged starting material is to be detected microscopically. The reaction product separates during the reaction and can be isolated by filtering. When working in this manner the 1-benzoylamino-4-aminoanthraquinone of the formula:

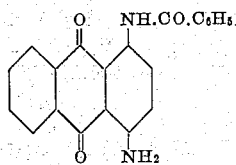

is obtainable in a good yield and in a good state of purity. It is soluble in pyridine and sulfuric acid of 96% strength with a reddish-violet coloration and crystallizes from nitrobenzene in blue-black crystals.

*Example 2.*—To a mixture of 20 parts of 1.5-diamino-anthraquinone, 336 parts of nitrobenzene and 10 parts of calcined sodium carbonate, a mixture of 13.6 parts of benzoylchloride and 27,1 parts of nitrobenzene is added within two hours while stirring and while maintaining the temperature at about 150° C. The melt is stirred up with 224 parts of ethylalcohol and filtered at about 80° C. The remaining 1.5-dibenzoyl-diaminoanthraquinone (obtained in small quantities) is washed twice with 32 parts (each time) of a mixture of equal parts of nitrobenzene and alcohol. The liquid containing the 1 - benzoylamino-5-aminoanthraquinone is allowed to cool over night, whereby the 1-benzoylamino-5-aminoanthraquinone of the formula:

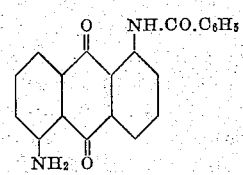

separates in a very pure form and with a good yield. It is filtered at 20° C. and finally washed with ethylalcohol. It is soluble in sulfuric acid of 96% strength with a faintly yellow-red coloration and crystallizes from nitrobenzene in golden-orange prisms.

Instead of ethylalcohol other aliphatic alcohols such as methyl, propyl-, isopropyl-, butyl-, isobutyl alcohol and the like can be used.

This is a continuation in part of our co-pending application Ser. No. 214,454 filed on August 20, 1927.

We claim:—

1. In the process of preparing monobenzoyl-diamino anthraquinones, the step which comprises heating a compound of the general formula

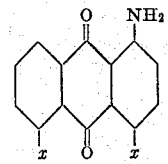

wherein one $x$ stands for hydrogen and the other $x$ for the amino group, with benzoylchloride in the presence of a high boiling inert organic solvent and of an acid binding medium, the benzoylchloride being slowly added in a quantity corresponding to about 120–140% of the theoretical amount.

2. In the process of preparing monobenzoyl-diamino anthraquinones, the step which comprises heating a compound of the general formula

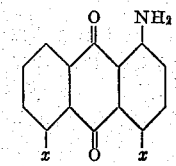

wherein one $x$ stands for hydrogen and the other $x$ for the amino group, with benzoylchloride in the presence of an organic solvent of the group consisting of nitrobenzene and ortho-dichlorobenzene, and of an acid binding medium in a quantity at least sufficient to bind all of the hydrochloric acid being liberated during the reaction, the benzoylchloride being slowly added in a quantity corresponding to about 120–140% of the theoretical amount.

3. In the process of preparing 1-benzoylamino - 5 - aminoanthraquinone, the step which comprises heating 1.5-diaminoanthraquinone with benzoylchloride to about 140–180° C. in the presence of an organic solvent of the group consisting of nitrobenzene and ortho-dichlorobenzene, and in the presence of an acid binding medium of the group consisting of the alkali metal carbonates, magnesium oxide and calcium oxide, the benzoylchloride being added slowly and in a quantity corresponding to about 120–140% of the theoretical amount.

4. The process of preparing 1-benzoyl-amino-5-aminoanthraquinone which consists in slowly adding benzoyl chloride in a quantity corresponding to 120–140% of the theoretical amount, while stirring, to a mixture of 1.5-diamino-anthraquinone, nitrobenzene and sodium carbonate, while maintaining the temperature between about 140–180° C., adding an aliphatic alcohol, filtering and cooling the filtrate until the 1-benzoylamino-5-aminoanthraquinone has separated.

5. The process which consists in adding to a mixture of 20 parts by weight of 1.5-diaminoanthraquinone, 336 parts by weight of nitrobenzene and 10 parts by weight of calcined sodium carbonate within 2 hours and at a temperature of about 150° C., a mixture of 27,1 parts by weight of nitrobenzene and 13,6 parts by weight of benzoylchloride, adding 224 parts by weight of ethylalcohol, filtering at a temperature of about 80° C. and cooling the filtrate until the 1-benzoyl-amino-5-aminoanthraquinone has separated.

In testimony whereof we have hereunto set our hands.

HANS BUCHLOH. [L. S.]
WALTER MIEG. [L. S.]
WALTHER STOETZER. [L. S.]